2,886,450

PROCESS FOR PREPARING STERILE EVAPORATED MILK

Aubrey P. Stewart, Jr., San Francisco, Robert A. Johnson, San Jose, and Donald F. Wilcox, Mill Valley, Calif., assignors, by mesne assignments, to Foremost Dairies, Inc., Oakland, Calif., a corporation of New York No Drawing. Application October 29, 1953
Serial No. 389,151

10 Claims. (Cl. 99—200)

This invention relates to a new and improved process for preparing a new sterile canned liquid product comprising solids derived from milk, with or without fat, and having a concentration of between substantially 16% and 35%.

This invention further relates to a new and improved process for preparing evaporated milk, with or without butterfat, including a concentrated milk similar to evaporated milk but having a concentration less or greater than that which characterizes commercial evaporated milk.

This invention also relates to the product resulting from the new and improved process of this invention.

For a number of years, it has been the practice to produce a concentrated milk in sterile condition sealed in cans. For the most part, the sterilization thereof has required the employment of a high temperature for a period of time which has imparted to the milk a cooked flavor and a brown color. When the sterilization was conducted in the can, the product, though possessing the characteristic cooked flavor and having the characteristic brown color, was substantially free of any tendency to age-thicken.

In view of the desirability of eliminating the cooked flavor and brown color which has characterized the products of the past, effort has been made to produce a satisfactory product by employing what is generally known as a high-temperature short-time sterilization treatment, and it has been known that the high temperature short-time method of sterilization is quite effective in minimizing the cooked flavor and brown color. It has not been used, however, as a sterilizing procedure for the reason that products so treated were found to have a marked tendency to age-thicken. In other words, whereas high-temperature short-time sterilization treatment was reasonably effective in eliminating one difficulty, namely, that of producing cooked flavor and brown color, it gave rise to the undesirable result of age-thickening which was avoided by the older method of sterilization. It was also found that when whole concentrated milk was sterilized by the high-temperature short-time method, the finished product exhibited a tendency for the butterfat to clump and to separate during storage.

According to the present invention, concentrated milk, such as evaporated milk, can be produced with a minimum of cooked flavor and brown color such as characterize the products subjected to high-temperature short-time sterilization treatment, while at the same time its resistance to age-thickening is increased to an extent productive of a highly satisfactory commercial product. Whereas the resistance to age-thickening of a product resulting from this invention perhaps is not as great as that which characterizes the products of the prior art having cooked flavor and brown color, yet it will resist undesirable age-thickening for periods of approximately one year, and in many instances fifteen to eighteen months, which is entirely adequate for good commercial usage.

It should be understood that if concentrated milk is subjected to high-temperature short-time sterilization without being further treated in accordance with the procedure of this invention, it will undergo undesirable age-thickening in a period of from three to six months, which period is too short for ordinary commercial handling and distribution. By extending the age-thickening period to approximately a year or better, the product is fully adapted to the handling and storage conditions encountered in ordinary commercial practice. It is known that milk which is too old, say, a year or more, is not particularly desirable for consumption on account of other changes which occur, and therefore it will be seen that by increasing the resistance to age-thickening to a year or eighteen months, the product has a stability comparable to its other keeping qualities.

In addition, treatment according to this invention also allows the utilization of the high-temperature short-time sterilization treatment with the attendant minimization of the production of cooked flavor and brown color while at the same time reducing the objectionable clumping and separation of the butterfat.

Another difficulty that has been noted in connection with high-temperature short-time evaporated milk is the development of a defect termed as "chalkiness." This chalkiness defect makes itself known to the person consuming the evaporated milk by a feeling of roughness in the mouth which resembles a suspension of chalk in the milk. The present method serves to minimize or in some cases eliminate this defect of chalkiness.

This invention is based upon the discovery that forewarming should be employed without employing disodium phosphate in conjunction therewith for stabilizing the product against coagulation of the protein in the sterilization treatment. In other words, one teaching of this invention is that the presence of disodium phosphate in the milk, when employed in the conventional manner, is to be avoided if tendency to age-thicken is to be minimized, and therefore reliance must be placed primarily upon forewarming treatments to stabilize the protein against coagulation.

As a second step, the invention is based upon the discovery that the increased resistance to the tendency to age-thicken as above described is realized if the milk, either with or without butterfat, is given a second heat treatment after it is forewarmed within the range of from approximately 180° F. for approximately 10 minutes to approximately 250° F. for approximately 1 minute at a concentration of between approximately 32% and approximately 45%, and thereafter is diluted back to a concentration of below approximately 30%, but in all instances to an extent which reduces the concentration from that at which it was heat treated by at least approximately 5%.

Whereas the chemical action resulting from this treatment is not fully understood, it is believed that the resistance to age-thickening is imparted to the product through the fact that it has been heat treated within the time and temperature ranges above specified in a more highly concentrated state than that which will characterize the finished product. In other words, it is thought that beneficial results flow from the fact that there is a closer molecular disposition of the milk particles when the product is over concentrated, and that the heat treatment is administered while the molecules are thus more closely associated, and that the reaction which results, though not capable of producing the same high resistance to age-thickening at that same concentration, will, however, produce a high resistance to age-thickening for the product when it is diluted back to a point below approximately 30%, and at least approximately 5% below the concentration of the heat treatment.

Inasmuch as the dilution serves to separate the particles somewhat from their closer association which characterizes the concentrated state of the product, it is thought that the close molecular arrangement during the heat treatment and the subsequent separation, to a degree, of the molucules incident to dilution, produces in the product the property of resisting age-thickening to the extent heretofore described.

In carrying out this invention, it is first desirable to subject the milk to a forewarming treatment and then concentrate it by conventional procedure to the desired degree of high concentration. In this step, the concentration will be adjusted to a desired level between approximately 32% and approximately 45%. As a next step, the highly concentrated milk will be subjected to a heat treatment within the range of between approximately 180° F. for approximately 10 minutes to approximately 250° F. for approximately 1 minute, and thereafted water is added thereto to bring the concentration to a point below approximately 30%. If the heating of the concentrated product is conducted at a concentration of below 35%, then the water will be added in sufficient amount to reduce the concentration to a point of at least 5% below that at which it was heat treated.

The next step can vary according to the preferences of the operator, as sterilization can be conducted either in the can or out of the can. If the former is selected, the product is homogenized before sterilization, canned, and then sterilized. If the latter is selected, the product is sterilized, homogenized, and then aseptically canned. In all instances, however, a high-temperature short-time sterilization is employed, as this is necessary to minimize cooked flavor and brown color.

Whereas some variation in the time and temperature employed for sterilization is possible, it is necessary that the time and temperature be so adjusted as to produce an $F_0$ value of at least substantially 5. The term $F_0$ is well known and standardized in the canning art. It may be readily determined and is regularly determined in the canning industry. Methods of determining this value have been published and widely distributed in the canning industry. This term and mathematical method for calculating thermo-processing times for canned foods, as developed by Dr. Charles O. Ball, are described in "Bulletin of the National Research Council," volume 7, part 1, No. 37, October 1923. At the time this bulletin was published, Dr. Ball was employed by the Research Laboratory of the National Canners Association, Washington, D.C.

Dr. Ball's calculations were subsequently simplified and it has now become quite customary to use the term $F_0$ value which is derived from Dr. Ball's calculations and in which his so-called "z" value is assumed to be equal to 18. This is explained in an article by C. R. Stumbo, of the Food Machinery Corporation, entitled "Bacteriological Considerations Relating to Process Evaluation," published in Food Technology, volume 2, No. 2, April 1948.

In the Martin Aseptic Canning System, referred to in the present specification, sterilization of foods is achieved by heating for very short times in the higher temperature ranges. It is well known that the higher the temperature the shorter is the time required to produce a specified sterility. The relation of the time and temperature or $F_0$ is expressed by the formula:

$$F_0 = m \times \text{antilog} \frac{T-250}{18}$$

where $m$ = minutes
$T$ = temperature, ° F.

From the above formula it will be seen that the sterilization value ($F_0$) is a logarithmic function of time and temperature, the time required for sterilization increasing ten-fold with each decrease of 18° F. in temperature. For instance, the following times and temperatures will give a sterilization value ($F_0$) of 10:

| | |
|---|---|
| 232° F. | 100 minutes. |
| 250° F. | 10 minutes. |
| 268° F. | 1 minute. |
| 286° F. | 0.10 minute or 6 seconds. |
| 304° F. | 0.01 minute or 0.6 seconds. |

This equation was taken from Dr. Ball's original publication.

A specific example of the process by way of illustration and not by way of limitation, is as follows:

Whole milk is forewarmed at a temperature of 250° F. and a holding period of 60 seconds, then evaporated to 40% total solids. The 40% total solids concentrate is then heated to 190° F. for a holding period of 7½ minutes, following which it is cooled and standardized to normal composition of evaporated milk—7.9–8.0% fat and 25.9–26.2% total solids.

After standardization, the evaporated milk is continuously (a) passed through a preheater to increase the temperature to 190° F.; (b) flashed into a vacuum to deaerate; (c) then through a high velocity heater which increases the temperature to 275° F.; (d) from the high velocity sterilizing heater, the product is passed through a holding pipe to give a 60 second holding period, following which (e) it is immediately cooled through a previously sterilized high velocity cooler to 170° F. At this point, (f) sterile air is injected and then (g) the product is homogenized at 4,000 p.s.i. pressure under sterile conditions, (h) cooled to approximately 90° F. in a previously sterilized cooler, (i) aseptically canned into previously sterilized cans, and (j) sealed with previously sterilized lids in an aseptic atmosphere.

This process, as stated above, gives optimum conditions for average production of evaporated milk. Some variations must be practiced, depending upon the composition of milk from region to region and from season to season. Also, some variations in this practice must be made if evaporated milk of higher than approximately 26% total soilds is to be produced. These variations will lie primarily in the temperature and holding time used in heating the over-concentrated product and in the sterilization time and temperature. Evaporated milk containing more than 26% solids, or manufactured during periods when the milk is of composition which would render it more unstable, requires either a higher temperature or a longer holding time when treating the over-concentrated milk. Also, it is frequently necessary to use a sterilization temperature of less than 275° F. and a longer holding period (to insure sterility) in order to not heat-coagulate the evaporated milk.

While the use of the present process in combination with aseptic canning gives more beneficial results through the ability of this process to utilize temperatures above 260° F. during sterilization, the basic principle of over-concentrating and heating the over-concentrate prior to sterilization applies also to the in-the-can sterilization process.

The aseptic canning process permits homogenization after sterilization, which is more desirable than homogenization prior to sterilization which is necessary when the product is sterilized in the can. While, therefore, the present process when combined with the aseptic canning process is capable of greater beneficial results, nevertheless the present process, when carried out with the in-the-can sterilization treatment, provides substantial benefits over prior practices in the preparation of concentrated milk.

While the term "evaporated milk" has been used in the above description of this invention, such usage is not to be construed as excluding similar concentrated milk products in which other fats and oils have been substituted for butterfat. In such cases it is to be further understood that the over-concentrating and pre-heating steps might be accomplished either in the presence or absence of fat.

While certain preferred methods of carrying out the process have been set forth in detail, it is to be understood that these are illustrative only as the process is capable of modification to take care of different conditions and requirements, and therefore such variations are contemplated as coming within the spirit and scope of the appended claims.

What is claimed is:

1. The process of producing sterile concentrated milk, which comprises the steps of forewarming fluid milk concentrating the milk to a concentration of between approximately 32% and approximately 45%, then subjecting the thus concentrated milk to a heat treatment within the temperature-time range of from approximately 180° F. for a period of approximately 10 minutes to approximately 250° F. for a period of approximately 1 minute, then adding water to the thus heated concentrate to dilute the same to a concentration below approximately 30% and in all instances in sufficient quantity to reduce the concentration below that at which it was heated by a minimum of approximately 5%, and sterilizing the concentrate thus produced by subjecting the same to a high-temperature, short-time sterilization treatment productive of an $F_o$ value of at least substantially 5.

2. The process defined in claim 1, further characterized in that the sterilized product is substantially homogenized and aseptically canned.

3. The process defined in claim 1, further characterized in that the product is homogenized prior to the step of sterilization.

4. The process defined in claim 3, further characterized in that the sterilization takes place after the homogenized product is canned.

5. The process of producing sterile concentrated milk, which comprises the steps of forewarming fluid milk concentrating the milk to a concentration of not less than approximately 5% greater than the final concentration desired, then subjecting the thus concentrated milk to a heat treatment within the time-temperature range of approximately 10 minutes at approximately 180° F. to approximately 1 minute at approximately 250° F., then adding water to the thus heated concentrate to dilute the same to the desired concentration, and sterilizing the concentrate thus produced by subjecting the same to a high-temperature, short-time sterilization treatment productive of an $F_o$ value of at least substantially 5.

6. The process defined in claim 5, further characterized in that the initial concentration is between approximately 32% and approximately 45%.

7. The process defined in claim 5, further characterized in that the final concentration is below approximately 30%.

8. The process defined in claim 5, further characterized in that the sterilized product is subsequently homogenized and aseptically canned.

9. The process defined in claim 5, further characterized in that the product is homogenized and canned prior to sterilization.

10. A stable and sterile evaporated milk product such as that produced by the process of claim 5.

References Cited in the file of this patent

UNITED STATES PATENTS

| | | |
|---|---|---|
| 2,087,962 | Ball | July 27, 1937 |
| 2,388,103 | Whitaker et al. | Oct. 30, 1945 |
| 2,490,599 | Otting | Dec. 6, 1949 |
| 2,553,783 | Park | May 22, 1951 |

OTHER REFERENCES

The Canned Food Reference Manual, 3rd edition, American Can Co., N.Y., 1947, pp. 316 and 318.

Journal of Dairy Science, vol. 26, No. 8, pp. 761–762.